Oct. 9, 1923.
J. D. BRAKERS
BAIT CASTING DEVICE
Filed Sept. 29, 1922
1,469,883
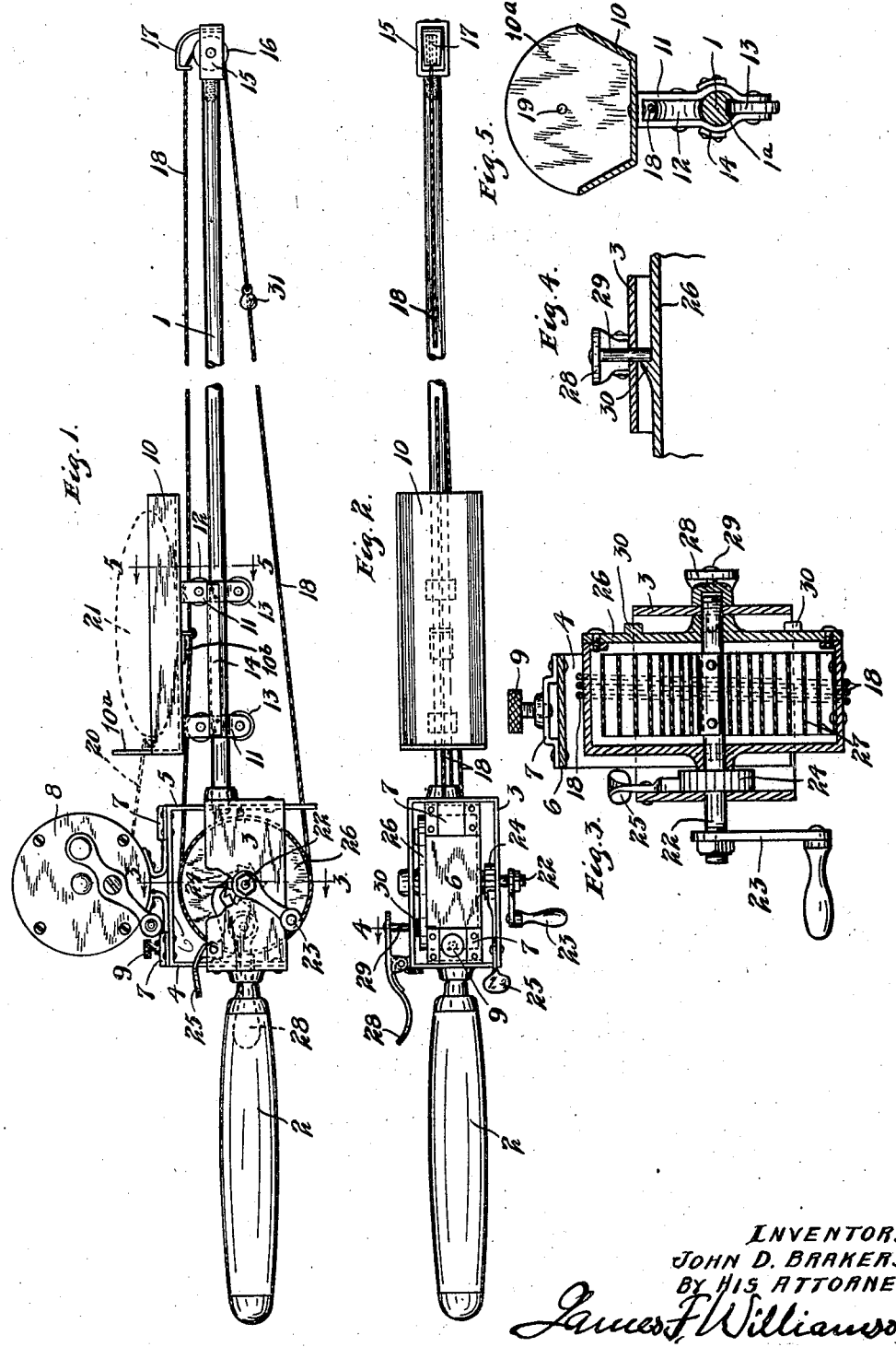
INVENTOR.
JOHN D. BRAKERS.
BY HIS ATTORNEY.
James F. Williamson Patented Oct. 9, 1923.

1,469,883

UNITED STATES PATENT OFFICE.

JOHN D. BRAKERS, OF ST. LOUIS PARK, MINNESOTA, ASSIGNOR OF FIFTY-ONE ONE-HUNDREDTHS TO GEORGE E. J. MASSEY, OF MINNEAPOLIS, MINNESOTA.

BAIT-CASTING DEVICE.

Application filed September 29, 1922. Serial No. 591,395.

*To all whom it may concern:*

Be it known that I, JOHN D. BRAKERS, a citizen of the United States, residing at St. Louis Park, in the county of Hennepin and State of Minnesota, have invented certain new and useful Improvements in Bait-Casting Devices; and I do hereby declare the following to be a full, clear, and exact description of the invention, such as will enable others skilled in the art to which it appertains to make and use the same.

This invention relates to a fishing apparatus, and particularly to a device for casting a bait. A great deal of fishing is done by casting a bait some distance and then reeling the bait in through the water. Both live bait and artificial bait is thus cast. To properly cast the bait requires considerable skill and even the most expert casters continually have trouble with their line. Furthermore, to continually cast during a day's fishing is quite fatiguing as the bait receives its propelling force from the muscular exertion of the caster.

It is an object of this invention, therefore, to provide means by which the bait can be easily cast the desired distance with a minimum of effort.

It is a further object of the invention to provide such a device comprising a longitudinal member on which a bait carrier moves to cast the bait whereby the bait can be accurately cast and deposited in a desired position.

It is more specifically an object of the invention to provide such a device having a spring drum operating on a flexible member for propelling said carrier and also having means whereby an ordinary fishing reel can be attached thereto.

These and other objects and advantages of the invention will be fully set forth in the following description made in connection with the accompanying drawings in which like reference characters refer to the same parts throughout the different views and in which, Fig. 1 is a view in side elevation of the device;

Fig. 2 is a top plan view thereof;

Fig. 3 is a vertical section on the line 3—3 of Fig. 1, as indicated by the arrows, shown on an enlarged scale;

Fig. 4 is a view in vertical section taken on the line 4—4 of Fig. 2, as indicated by the arrows, and shown on an enlarged scale; and Fig. 5 is a vertical section taken on the line 5—5 of Fig. 1, as indicated by the arrows, and also shown on an enlarged scale.

Referring to the drawings, the device comprises a rod or longitudinally extending member 1 which will be of considerable length, having a handle 2 at the rear end thereof. The handle is secured to the rear end of a frame or housing member 3 of rectangular shape, open at its top and bottom and to the ends of which are secured at its inner sides the vertical plate members 4 and 5 carrying the top member 6. The rod 1 is secured to the front of the members 3 and 5, the former of which has a projecting boss receiving said rod. The top member 6 is provided with spaced clips 7 adapted to receive the attaching plates of a standard fishing reel 8, the rear clips 7 being provided with a knurled headed screw 9 adapted to hold the detaching plate of said reel firmly in position.

A carrier member 10 comprising a trough open at its front end and having a vertical closing plate 10ª at its rear end, is mounted for traveling movement on the rod 1 and has secured to its lower side, spaced brackets 11 in which are journaled a top sheave 12 having a curved surface fitting the surface of said rod and a bottom guiding wheel 13 substantially fitting in a slot formed in the bottom of the rod 1. The sides of the brackets 11 are curved to substantially fit the said rod and are connected by narrow plates 14 extending at each side thereof. The carrier 10 is thus supported in position and movable on said rod, the sheaves 12 and 13 forming an anti-friction means therefor, which, together with the brackets 11, guide the carrier in its movement. The end of rod 1 has a rectangular bracket 15 secured thereto in which is journaled a grooved sheave 16 and a small hook bracket 17 extends from the front of said bracket 15 over the sheave 16 and is provided with an aperture through which passes a flexible line or cord member 18 to be later described. The rear plate of carrier 10 has an aperture 19 through which the line 20 passes. This line is the ordinary fish line and will be wound upon the reel 8, the bait 21 being secured to the end of this line and disposed loosely in the carrier 10.

A shaft 22 is transversely mounted in the member 3 and has secured to one end, the crank handle 23. A ratchet wheel 24 is secured to said shaft immediately inside of the member 3 with which a spring-pressed pawl 25 co-operates to prevent movement of said shaft in one direction. Loosely mounted upon the shaft 22 is a drum 26 and a motor is provided therefor which, in the embodiment of the invention illustrated is in the form of a flat spiral spring 27 of the clock spring type has one end secured to the shaft 22 and has its other end secured to the inside periphery of the drum 26. A spring-pressed finger lever 28 is mounted on the side of member 3 opposite to that on which the pawl 25 is secured and carries at its outer end a plunger 29 adapted to co-operate with one of a plurality of ratchet teeth 30 formed on the side of the drum 26. The flexible line or cord 18, as stated, passes over the sheave 16 and has its top strand attached to a small bracket 10$^b$ secured to the bottom of the carrier 10. The cord then passes through an aperture in the front plate 5 and is wound in a plurality of turns about the drum 26 from which it passes again through an aperture in the plate 5 and to the sheave 16. This endless cord has a stop member or button 31 secured thereto adapted to abut against the plate 5 when the lower strand of the cord moves inwardly and the carrier 10 moves outwardly.

In operation, the bait, which may be either a plug, or other artificial bait device, or which may be a live bait on a hook, is loosely placed in the carrier 10. The carrier is drawn inward on the rod 1 to substantially abut against the front plate 5. The carrier can so be drawn inward either by the reel 8 or by turning the handle 23. If the handle 23 is turned, the pawl 25 must be pressed out of contact with ratchet 24. The line 20 should, of course, be wound on reel 8 when the carrier moves inwardly. With the bait in position, described, the handle 23 is then turned in a clockwise direction and the spring 27 will be wound up, the drum 26 being kept from turning by the plunger 29. After the spring has been wound to a sufficient tension, the lever 28 will be pressed inwardly and the plunger 29 moved out of contact with the drum. The spring motor will now turn the drum very rapidly and said drum will, by its friction with the cord 18, traverse the same so that the carrier 10 will be moved outwardly on the rod 1 at high speed. When the member 31 contacts with plate 5 the motion of the carrier will be stopped and the bait 21 will be projected forwardly from the carrier and the line 20 unwound from reel 8. The bait is thus projected and can be directed to the spot desired by properly holding the rod 1 in the desired direction. The bait, after being cast out, can again be reeled in by the reel 8 and the parts again set as described.

From the above description it is seen that applicant has provided quite a simple and efficient device for casting a bait. The device can be made comparatively light and the operation thereof requires no particular skill and practically no exertion. When several persons are fishing from a boat, it frequently happens that the boat is tipped and upset by the movements of the parties in casting. Such accidents have often resulted in loss of life. With the present device, this danger is eliminated, as practically no motion is necessary for the casting operation. With the present invention, the bait can also be cast from a sitting position and it is also possible to cast the bait from under an awning on the boat or from under trees along the bank, which latter operations are impossible with the ordinary method of casting. The bait, also, can be directed to the desired spot and cast outwardly a long distance. As stated, the device is constructed to receive a standard reel on top thereof which can be quickly and easily applied.

It will, of course, be understood that various changes may be made in the form, details and arrangement of the device without departing from the scope of applicant's invention, which, generally stated, consists in the matter shown and described and set forth in the appended claims.

What is claimed is:

1. A bait projecting device having in combination, a supporting member, a traveling carrier for loosely holding the bait, and means including a motor driven drum for moving said carrier a certain distance at high speed to project the bait from the same.

2. A bait casting device comprising a carrier adapted to loosely support the bait, means for moving said carrier at high speed including a flexible member attached to the carrier, and a drum about which said member is wound for traversing the same.

3. A bait projecting device comprising a longitudinally projecting rod, a bait carrier movable longitudinally thereon, a flexible member attached to said carrier, a drum for traversing said flexible member and carrier, a wind-up spring for actuating said drum, a retractile stop holding said drum against rotation while said spring is wound, and a handle and pawl and ratchet mechanism for winding said spring.

4. A bait projecting device comprising a supporting member, a reel thereon, a line mounted on said reel to which a bait is attached, a longitudinally extending member, a carrier guided for longitudinal movement thereon adapted to receive the said bait, flexible means connected to said carrier, and a spring actuated drum acting on said flexible member to propel said carrier along said longitudinally extending member at high speed.

5. A bait projecting device comprising, a rod, a sheave mounted at the outer end thereof, a carrier adapted to support a bait guided for longitudinal movement along the top of said rod, a flexible member connected to said carrier and running over said sheave and above said rod, means at the other end of said rod constructed and arranged to act on said flexible member to rapidly traverse the same and move said carrier along the rod to project the bait and a spring stop adjacent said sheave through which said flexible member moves.

6. The structure set forth in claim 5, a reel mounted above said rod, a line thereon to which said bait is attached, said carrier having an aperture therethrough through which said line passes whereby the carrier can be drawn along said rod by said reel.

7. A bait projecting device comprising a rod, a carrier mounted for longitudinal movement along the same and adapted to carry a bait, and means comprising a spring-actuated drum, and a flexible member extending there-around and attached to said carrier for moving said carrier along the rod at high speed to project the bait.

8. A bait casting device comprising, a rod, a trough having an open front end and a rear closed end mounted for movement along the top of said rod, anti-friction means engaging said rod and guiding said trough thereon, a sheave at the outer end of said rod, a flexible member attached to said carrier and running over said sheave, a spring-actuated drum over which said flexible member runs and by which it is frictionally engaged, means for placing said drum under tension, and a trip means for releasing said drum to move said flexible member and propel the carrier along the rod at high speed to project the bait therefrom.

9. The structure set forth in claim 8, said flexible member being endless and attached to the bottom of said trough, and a stop means on said flexible member for limiting the movement of said trough.

10. A bait casting device comprising a housing, a handle connected to one end thereof, a rod connected to the other end thereof, a shaft journaled in said housing, a drum loosely journaled on said shaft, a tension spring connected to said shaft and said drum, means for holding said drum in position, means for turning said shaft to place said spring under tension, a flexible member passing around said drum, a carrier movable on said rod to which said flexible means is connected, and a trip means for releasing said drum whereby the flexible member is moved and the carrier rapidly moved along the rod.

11. A bait casting device comprising a rod provided with a handle, a traveling carrier movable longitudinally of said rod, and means including a flexible endless cord attached to the carrier for moving the same along said rod at high speed to project the bait outwardly.

In testimony whereof I affix my signature.

JOHN D. BRAKERS.